June 18, 1935.  J. BORDENER  2,004,974
COMBINATION BOTTLE OPENER
Filed Aug. 23, 1933
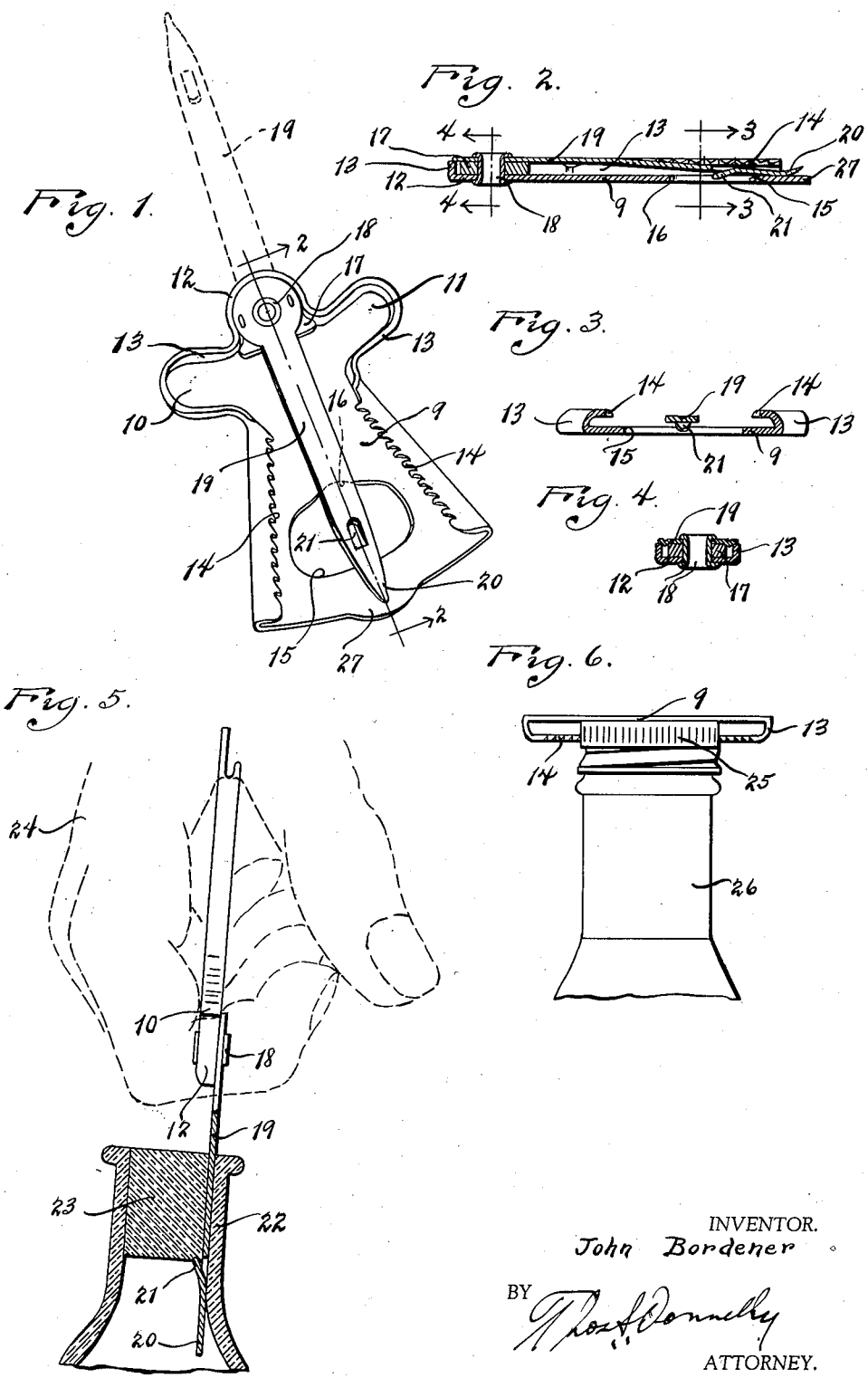
INVENTOR.
John Bordener
BY
ATTORNEY.

Patented June 18, 1935

2,004,974

UNITED STATES PATENT OFFICE 2,004,974

COMBINATION BOTTLE OPENER

John Bordener, Detroit, Mich.

Application August 23, 1933, Serial No. 686,371

2 Claims. (Cl. 65—47)

My invention relates to a new and useful improvement in a combination bottle opener and has for its object the provision of a device which may be used for removing crown corks or screw caps or ordinary corks from bottles.

It is an object of the present invention to provide a device of this class which will be simple in structure, economical of manufacture, durable, compact, light and of such a nature that it may be easily and quickly operated to effect the purposes intended by its use.

Another object of the invention is the provision of a cork removing blade mounted on a suitable supporting body so that the blade may be moved to shielded or protected position so as to permit the device to be carried in the pocket.

Another object of the invention is the provision of a device of this class having a gripping portion so arranged and constructed that a cork removing blade may be easily thrust into position and the cork removed from a bottle without removing the hands from the device.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of the invention.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 2.

Fig. 5 is a side elevational view of the invention showing an application of the same in use.

Fig. 6 is an end elevational view of the invention illustrating its use.

The invention comprises a plate 9 having the laterally projecting wings 10 and 11 and a centrally positioned, outwardly projecting lug or supporting body 12. The marginal edges of this plate are turned upwardly to provide the flange 13, and extending around the main body, the flange 13 is bent inwardly and provided with the teeth 14. It will be noted that the space between the teeth 14 on the oppositely positioned flanges is convergent toward the end on which the wings 10 and 11 are formed. An opening 15 is formed in the body 9. This opening is outwardly bulged as at 16. Positioned on the portion 12 is a spacer 17 through which extends the rivet 18 which serves to pivotally mount the extracting blade 19 on this body. This blade is slightly bowed intermediate its ends and formed from resilient material. The free end 20 is tapered to a point, and adjacent the free end there is punched from the blade 19 an outwardly bent, extracting tongue 21.

When it is desired to swing the blade 19 on its pivot it is necessary that the free end of the blade be flexed upwardly so as to clear the oppositely positioned teeth bearing flanges as normally this blade rests with its free end in engagement with one face of the body 9 as clearly appears in Fig. 2.

The body 9 may be used to remove a crown cork from a bottle, the corner of the outwardly bulged portion 16 of the opening 15 engaging the edge of the crown cork, while the opposite edge of the opening 15 will lie across the top of the cork so that an upward tilting of the body 9 will effect a removal of the crown cork from the bottle.

In Fig. 5 I have illustrated the invention used for extracting from a bottle neck 22 a cork or stopper 23 of the usual cork construction. When it is desired to use the device for this purpose, the extracting blade 19 is swung into the position shown in dotted lines in Fig. 1 or in full lines in Fig. 5. The main body 9 is then gripped in the hand so that the laterally extending wings 10 and 11 are gripped by separate fingers to press the end of the body 9 into the palm of the hand 24. The extracting blade 19 may then be thrust downwardly between the neck of the bottle and the cork 23 with the tongue 21 facing toward the cork. When this tongue is thrust inwardly sufficiently to clear the lower end of the cork, it will spring outwardly into engagement with the inner surface of the cork so that an outward pulling on the device will effect a removal of the cork 23 from the bottle neck 22.

In Fig. 6 I have illustrated the invention used for removing a screw cap 25 from a bottle neck 26. In order to use the device in this manner, the blade 19 is swung outwardly so that the space between the teeth 14 is clear. The body 9 is then laid upon the top of the screw cap 25 with the teeth 14 positioned at opposite sides thereof. It will be noted that the teeth 14 at opposite sides are faced in opposite directions and when the body 9 is moved inwardly so that the screw cap 25 is engaged at opposite sides by the teeth 14, the teeth will serve to grip the screw cap when a rotative movement is effected so as to easily remove the screw cap from the bottle.

The plate 9 is outwardly bulged as at 21 so as to form a protective shield for the point of the blade 19.

It is obvious that the device is of such a nature that it may be carried in the pocket, thus affording a device which may be easily carried about from place to place, and which is possessed of a maximum number of uses in opening bottles and the like.

While I have illustrated and described the preferred construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. A device of the class described, comprising a flat plate-like supporting body; laterally extending wings on opposite edges of one end of said body; a flange projecting outwardly of one face of said body at the marginal edges thereof and extending around said wings; and an extracting blade pivotally mounted at one end on one end of said body and swingable thereon into operative and inoperative position, said body forming a shield for said blade, said blade in its movement from one position to another riding over said flange.

2. A device of the class described, comprising a flat plate-like supporting body; laterally extending wings on opposite edges of one end of said body; a flange projecting outwardly of one face of said body at the marginal edges thereof and extending around said wings; and a resilient extracting blade pivotally mounted at one end on one end of said body and swingable thereon into operative and inoperative position and adapted for lying below the outer edge of the marginal flange on said body when in inoperative position, said blade in its movement from one position to another riding over said flange.

JOHN BORDENER.